United States Patent Office 3,210,334
Patented Oct. 5, 1965

3,210,334
CATALYTIC POLYMERIZATION OF ETHYLENE
Wayne L. Carrick, Essex Fells, N.J., assignor to Union Carbide Corporation, a corporation of New York
No Drawing. Filed Mar. 25, 1957, Ser. No. 647,932
39 Claims. (Cl. 260—94.9)

This invention relates to a novel catalytic polymerization of ethylene to yield improved solid ethylene polymers.

More particularly, the invention is concerned with the employment of novel metallo-organic catalyst compositions highly effective in promoting rapid polymerization of ethylene at relatively low reaction temperatures and pressures.

Furthermore, the invention includes the production of novel normally solid ethylene homopolymers particularly characterized by being essentially linear in molecular chain structure and by a relatively narrow molecular weight distribution of ethylene polymer molecules, these being principally moderately high molecular weight ethylene molecules. The novel ethylene homopolymers prepared as herein described contain only a minimum concentration of waxy low-molecular weight ethylene polymer components and of extremely high molecular weight ethylene polymer components.

Numerous procedures have been proposed to polymerize ethylene to normally solid polymers. Of these, the oldest and most successful has been the high-pressure, high temperature polymerization technique first described in 1937 in British Patent 471,590 by Fawcett et al. Ethylene polymers prepared by this procedure have been reported as having a density at 23°/23° C. of 0.91–0.92 and a melting temperature of 105° C.–115° C.

Newer polymerization procedures not dependent upon the use of high pressures or temperatures have enabled the production of normally solid ethylene homopolymers of considerably higher density being between about 0.94 and 0.96 and of much higher melting temperatures, e.g., of about 125° C.–135° C. These newer processes employ various metal compounds as ethylene polymerization catalysts. One of the new catalyst systems is based on the use of aluminum trialkyls promoted with a reducible compound of a metal of the IV–B, V–B, or VI–B groups of the Periodic System of Elements. Another ethylene polymerization catalyst system is based on a reducible oxide of a metal of group VI in association with an active or promoting support material.

Presently available information of these higher density polyethylenes shows these polymers to be considerably poorer in resistance to impact shock than the older type polyethylenes made by the high pressure and high temperature polymerization technique of Fawcett et al. (cf. "Polyethylene," pp. 366–367, by Raff and Allison, published 1956 by Interscience Publishers, Inc., New York). Furthermore, such polyethylenes contain not only relatively large amounts of low molecular weight polyethylenes but also significant amounts of extremely high molecular weight polyethylenes.

It has now been found that high density polyethylene comprising a mixture of ethylene homopolymers of a comparatively narrow spread in the molecular weights of said homopolymers can be obtained by polymerizing ethylene in contact with a dispersion or a solution in an inert hydrocarbon solvent of a catalyst composition comprising essentially three components, one component being a hydrocarbon-soluble aluminum trihalide, the second component being an organo-metallic compound or a halogen substituted organo-metallic compound in which the halogen is directly attached to the metal, of a metal selected from the Groups II–B, IV–A and V–A of the Periodic Chart of the elements, and a third component which should be present in only minute amounts based on the weight of the first two components being a hydrocarbon soluble compound of vanadium, or a vanadium compound which can become hydrocarbon soluble by reaction with the other catalyst components.

Aluminum trihalides found particularly effective as the first components are aluminum tribromide and aluminum trichloride. Aluminum trifluoride due to its insolubility generally in hydrocarbons is ineffective. The use of aluminum triiodide as one of the catalyst components is attended by very low yields of polyethylene. It has further been found that the aluminum trihalides are unique in these catalyst compositions and cannot be satisfactorily replaced by other Lewis acids.

The organo-metallic compounds of the second component are exemplified by the organo compounds of the following metals, namely:

Group II–B:
  Zinc
  Cadmium
  Mercury
Group IV–A:
  Germanium
  Tin
  Lead
Group V–A:
  Antimony
  Bismuth The hydrocarbon portion of these metallo-organic compounds are preferably alkyl or aryl groups, in particular phenyl groups which generally promote higher polymer yields.

Typical representative metallo-organo compounds useful as the second member of the catalyst composition are as follows; the listing, however, is to be regarded in exemplification and not restriction of the useful compounds.

di-n-butyl zinc
dimethyl zinc
di-o-tolylzinc
dibutyl cadmium
diisoamyl cadmium
diphenylmercury
dibenzylmercury
diisoamylmercury
di-n-hexylmercury
ditolylmercury
amyltriphenylgermanium
benzyltriphenylgermanium
butyltriphenylgermanium
hexabenzyldigermane
hexaphenyldigermane
tetra-i-amylgermanium
dibenzyldiethylstannane
diethyldiisobutyltin
diethyldiphenyltin
dimethyldiethyltin
triphenyl tin bromide
triphenylbismuthine
triphenyl tin chloride
hexaethylditin
hexaphenylditin
phenyltribenzyltin
tetra-n-amyltin
tetracyclohexyltin
tetraphenyltin
tribenzylethyltin
tetraethyllead
tetraphenyllead
tetra-n-propyllead triethylantimony
triphenylstibine
triethylbismuthine utes. In each experiment as tabulated in Table I different concentration and catalyst components were examined for their effect, if any, in promoting ethylene polymerization.

TABLE I

| Experiment No. | Aluminum halide | Organo-metallic compound | Hydrocarbon soluble vanadium compound | Results |
|---|---|---|---|---|
| 1 | None | 0.5 gm. aluminum triisobutyl | 6.0 mg. vanadium tribromide | No polymerization. |
| 2 | ____do____ | 0.25 gm. aluminum triisobutyl | 0.3 mg. vanadium tribromide | Do. |
| 3 | ____do____ | 1.75 gm. aluminum triisobutyl | ____do____ | Do. |
| 4 | ____do____ | 0.6 gm. tetraphenyl tin | ____do____ | Do. |
| 5 | 2.0 gm. aluminum tribromide | None | ____do____ | Do. |
| 6 | 2.0 gm. aluminum tribromide (pure, traces of $VBr_3$ removed by double distillation). | 0.6 gm. tetraphenyl tin | None | Do. |
| 7 | 2.0 gm. aluminum tribromide | ____do____ | 0.3 mg. vanadium tribromide | Rapid polymerization yielding a high density impact resistant polyethylene. |

The preferred metallo-organic compounds as determined by high yields of polyethylenes per unit weight of catalyst composition are those of tin, mercury, and bismuth. Of these, the highest catalyst efficiency have generally been obtained by the metallo-organic compounds of tin having the formula $SnR_nX_m$ wherein R is aryl, X is chloride or bromine, $n$ is either 3 or 4, $m$ is either zero or one, and $n+m$ equals 4.

The third catalyst component, namely, a compound of vanadium is preferably one soluble in an inert hydrocarbon liquid, as for example, benzene, cyclohexane, decane, isooctane, methyl cyclohexane, butane, propane, or heptane, or alternatively, a compound which can form a hydrocarbon soluble compound by interaction with the trihalide; moderate heating up to the refluxing temperature of the hydrocarbon liquid can be used to accelerate this interaction.

Suitable hydrocarbon soluble vanadium compounds are vanadium oxytrichloride, vanadium tribromide, vanadium tetrachloride, and vanadium pentafluoride.

Compounds of vanadium which form hydrocarbon soluble products on interaction with an aluminum halide by heating the two components together in the presence or absence of the hydrocarbon are exemplified by vanadium dichloride, vanadium dibromide, di-cyclopentadienyl-vanadium dichloride, vanadium pentoxide, and vanadium oxydichloride.

Although vanadium is a transition element, other transition elements cannot be substituted for it in this invention. The use of such metal salts as titanium tetrachloride and zirconium tetrachloride when substituted for the vanadium compound under all other essential conditions of this invention yields no polymer.

A characteristic shared by all the compounds used as the first two components (aluminum halide and organo-metallic compounds) of the catalyst composition is that when used together, and in the absence of the vanadium compound, they do not promote the polymerization of ethylene to a normally solid polymer.

However, most surprisingly, the presence in the catalyst composition of mere traces of the third component, namely a hydrocarbon-soluble compound of vanadium, activates the entire catalyst composition whereby ethylene, when contacted therewith is rapidly polymerized to tough impact-resistant, high density polyethylene.

The unique activation or triggering action shown by minute amounts of the hydrocarbon-soluble vanadium compound in combination with the other two components to effect catalytic polymerization of ethylene does not extend to combinations of it and only one of the other components, nor does it extend to aluminum alkyl compounds which in admixture with large amounts, e.g., equimolar ratios, of vanadium halide are known active catalyst compositions for polymerization of ethylene.

This is demonstrated by the following experimental data obtained by bubbling ethylene gas at a flow rate of 1.5 liters per minute into a glass flask containing 700 ml. of cyclohexane maintained at 50° C. for 30 to 60 min- In general, the effective catalyst compositions of the present invention comprise those compositions in which the aluminum halide and the organo-metallic compound together constitute the major portion by weight of the composition, and the activating hydrocarbon soluble vanadium compound is present in only minute amounts. Polyethylenes of the desired linearity and narrow molecular weight distribution are obtained by using a molar concentration from 0.0005 to 0.05 mole of the vanadium compound per mole aluminum halide. At higher vanadium concentrations than 0.05 mole per mole $AlX_3$, the resultant polymer product becomes one of broader molecular weight distribution and/or higher chain branching. Concentrations of vanadium less than 0.0005 may be used but in such systems the catalyst is, of course, much more susceptible to poisons.

The minute amounts of the hydrocarbon soluble compounds of vanadium need not be added as separate entities to form an effective catalyst composition since such vanadium compounds have been found present in amounts sufficient to produce polymerization as normal impurities in all technical grades and even practically all of commercial "chemically pure" grades of the aluminum halides thus far examined. This is not unexpected since so far as known, no attempts are made in the commercial product to eliminate completely from alumina or bauxite, the intermediate used in the production of the halides, minute amounts of vanadium or its compounds.

A unique feature of this catalyst system is the extremely efficient use of the vanadium compound. Each molecule of vanadium seems to activate the production of many polymer molecules. For example, in one experiment, 0.00041 millimole of $VBr_3$, 20 millimoles of pure $AlBr_3$, which had been treated to remove all vanadium compounds and 5 millimoles of tin tetraphenyl were dispersed in 4 liters of cyclohexane. When ethylene was passed into this mixture at 60° C.; there was obtained 142 grams of polyethylene. The weight average molecular weight of this polyethylene was 250,000. Since the number average molecular weight cannot be greater than the weight average molecular weight, the 142 grams of polymer produced in this experiment corresponds to at least 0.57 millimole of polyethylene. This means that the average vanadium atom had participated in the production of over 1000 polyethylene molecules. Apparently, in the catalyst system herein disclosed every vanadium atom may participate in the reaction.

Furthermore, it has been found that the rate of polymerization may be affected by the vanadium concentration. When the vanadium concentration is varied over a wide range (from about 5 mg. to 0.03 mg. per liter of hydrocarbon diluent), the rate of polymer formation increases with increasing vanadium concentration.

Furthermore, unlike other disclosed catalyst systems for polymerizing ethylene, the catalyst components herein described can be dispersed in a hydrocarbon diluent and usually can be filtered through a bacterial filter (pore size 1–2 microns) under an argon atmosphere with little or no diminution in activity. For example, a 1-liter 3-necked round bottom reaction flask was fitted with an all glass stirrer, a bacterial filter and Y-tube to which was attached a gas inlet tube and a condenser. The bacterial filter operated under 900 mm. pressure and a separate nitrogen line was used to supply an inert atmosphere. Another nitrogen line was introduced through an opening in the stirrer sleeve and allowed to exit by bubbling through a mercury trap (5 mm. head) attached to the top of the condenser. The ethylene line was fitted with a bleed just above the gas inlet tube. With this bleed the ethylene line was kept under ethylene pressure even when ethylene was not entering the reactor. After purging all the gas lines, 600 ml. of cyclohexane was added to the flask and boiled to remove traces of water. The premixed catalyst 0.2 g. $AlCl_3$, 0.2 gram tetraphenyl tin, 0.5 mg. $VCl_4$ in 125 ml. of cyclohexane was refluxed for 15 minutes then added to the filter. At this point ethylene flow to the reaction flask had been cut off with a pinch clamp and a nitrogen flow was introduced to prevent the coating of the bottom of the filter with polyethylene. Filtration took about 1.5 hours, the solution turning slightly yellow at this time. During the entire addition, the cyclohexane in the flask was kept at reflux to keep out oxygen and the contents of the filter were heated with an infra-red heat lamp to prevent precipitation of the catalyst. Upon completion of filtration, ethylene was introduced and the reaction allowed to cool. A yield of 11.2 grams polyethylene was obtained. This solubility appears to be unknown in any other disclosed low-pressure ethylene polymerization catalyst. This solubility obviously gives rise to the most uniform catalyst distribution possible and is probably responsible, at least in part, for the high productivities achieved and the narrow molecular weight distribution of the polyethylene produced.

The proportion of aluminum trihalide to organo-metallic compound in the catalyst composition is not critical. For example, the molar ratio of aluminum halide:organometallic compound has been varied from about 1:20 to 20:1. Economic reasons usually prescribe an aluminum halide:organo-metallic compound molar ratio between 5:1 and 1:1. Although there is considerable latitude in the choice of specific proportions, a preferred range is 50 percent to 90 percent aluminum tribromide, remainder tin tetraphenyl (on a molal basis).

Anhydrous aluminum halides and vanadium halides in general are hygroscopic; therefore, special care should be taken to exclude water. Exposure of these two catalyst components to air or oxygen should also be avoided since this can seriously reduce polymer yield. After the catalyst components have been mixed, however, with the hydrocarbon diluent, a small amount of oxygen in the system can be beneficial. For example, when the catalyst compositions are used to polymerize ethylene containing about 50–3000 p.p.m. of oxygen, the polymer forms in smaller particles than it does when an ethylene source containing 0–25 p.p.m. oxygen is used. The smaller particles are advantageous in some instances. For example, polymer in the form of small particles is more effectively treated during slurry-washing to remove catalyst residues.

The polymerizations described herein can be conducted in the presence of an inert diluent which is liquid at the reaction temperature and pressure and which is selected from the saturated aliphatic (e.g., propane, decane), saturated cycloaliphatic (e.g., cyclopentane), and aromatic hydrocarbons (e.g., benzene) and while serving as a solvent for the ethylene need not necessarily function as such for the ethylene polymer. The amount of diluent present to obtain a polymerization is not critical. Total catalyst to diluent ratios are not critical; thus, ratios of one millimol per 500 grams of diluent are thoroughly operative. The diluent should be purified to remove reactive impurities such as acetylene and compounds containing highly polar substituents (i.e., nitriles and the like), oxygen, sulfur, active hydrogen (i.e., alcohols, water, amines), or non-terminal olefinic unsaturation (i.e., cyclohexene, butene-2) which react with the catalyst and consequently inactivate it. Particularly suitable hydrocarbons are, for example, methylcyclohexane, cyclohexane, hexane, heptane, isooctane, pentane, and highly purified kerosene.

The polymerization of ethylene using the catalyst compositions herein described can be readily conducted by feeding ethylene substantially free from acetylene, ketone, water, and other of those contaminants indicated above as being reactive with the catalyst, to a dispersion of the catalyst composition in a suitable inert hydrocarbon solvent maintained at a temperature from about 10° C. to 140° C. and at pressures from subatmospheric to about 50 p.s.i.g. Inert gases such as nitrogen and argon can be used in admixture with the ethylene to yield partial pressures of ethylene of less than one atmosphere. One method of reducing the polymer average molecular weight consists in using ethylene partial pressures less than one atmosphere. Higher pressures may be used if desired, but are ordinarily not required to obtain good yields of polymer. Generally the ethylene polymer forms as a precipitate of irregular size particles which can be filtered out of the hydrocarbon diluent. The filtered polyethylene particles can be washed with suitable polar liquids such as water or alcohols, particularly ethanol and propanol, to remove catalyst residues.

In some instances the ethylene polymer as formed may go in solution in the hydrocarbon solvent because the polymerization temperature is high enough (usually when above 110° C.) to promote solubility. In such case, the cooling of the solution as, for example, below about 80° C.–70° C. causes precipitation of the polymer.

The ethylene homopolymers prepared in the presence of this catalyst composition are all of relatively high molecular weight. As normally practiced, this invention usually yields polyethylenes having a melt index of less than 10 at 190° C., although products having melt indices as high as 100 can be produced. The "melt index" test is determined according to ASTM test method D–1238–52T.

The melt index value of the polyethylene is dependent to some extent on the concentration of the catalyst in the hydrocarbon liquid. Polyethylenes having a melt index of less than 0.1 are normally obtained by polymerizing ethylene in the presence of less than 12 millimoles total catalyst composition per liter of hydrocarbon liquid. Higher catalyst concentrations yield products of higher melt index. The melt index of the polyethylene can also be increased by using reaction temperatures above 80° C., oxygen concentrations of greater than 500 p.p.m. in the ethylene feed, and additives such as HCl.

The efficiency of the catalyst compositions used at a polymerization temperature of 60–65° C. and at atmospheric pressure has thus far reached a value of as much as 300 pounds of polyethylene per pound of total catalyst composition based on a total catalyst concentration of 0.75 to 2.0 millimoles per liter with a catalyst ratio of 2.5 moles of aluminum chloride per mole of tin tetraphenyl and 0.005 millimole of vanadium tetrachloride per liter. The productivity in terms of pounds of polymer per pound of catalyst is reduced when the catalyst concentration is increased beyond about 10 millimoles per liter of hydrocarbon solvent. The best catalyst efficiencies are obtained in the range of 0.75–3.0 millimoles per liter. Due to practical limitations resulting from the presence of impurities in the system, concentrations of catalyst below 0.50 millimole per liter are difficult to work with and the efficiency of the catalyst may thus be impaired by poisoning. In a system using more rigorously purified reagents, concentrations of catalyst lower than 0.50 millimole per liter can still be used with advantage.

Is was surprising to discover, however, that the catalyst compositions are ineffective for the homopolymerization of olefins other than ethylene since no solid polymer was formed in the instance of propylene, n-octene, butene-1, and isobutylene. Some cationic polymerization to give oils is found with these monomers.

The invention is further illustrated by the following examples, although it is to be understood that the satisfactory practice of the invention is not necessarily restricted to these specific embodiments.

*Example 1*

To a three liter flask fitted with a stirrer, gas inlet tube, thermometer, and reflux condenser were added 0.69 gram of triphenyl bismuthine and two liters of purified cyclohexane. The mixture was heated to boiling to remove traces of water. The heating was then stopped and, to displace air in the system, C.P. grade ethylene as supplied by Matheson Co., Inc., was bubbled through the reaction mixture while the solution was cooled to 60° C. There was then added 85 ml. of a cyclohexane solution of aluminum chloride containing 0.5 gram aluminum trichloride of C.P. grade and 3 mg. of vanadium tetrachloride, said solution being at 80° C. The ethylene flow at this point (about 3 liters per minute) was sufficient to maintain a continual blow-off of ethylene. In 30 minutes with the reaction system at 60–65° C., 28 grams of polyethylene formed in insoluble chunks averaging about ½ inch thickness. Seven hundred fifty ml. of isopropanol were added to the reaction flask and the polymer was removed by filtration. The polymer was washed one on a Büchner funnel with one liter of isopropanol and twice with one liter quantities of methanol with stirring. The polymer was then filtered on a Büchner funnel and washed once more with one liter of acetone. It was air-dried for one day and finally vacuum dried at 40° C.–60° C. overnight. This polymer had <0.05 percent methyl group content, density of 0.957 (annealed), and a melt index of <0.01.

Using the following concentrations of catalytic components in the procedure described in Example 1, these yields were obtained:

*Example 2*

Passing ethylene into 2.05 grams of triphenyl phosphine, dissolved in 2 liters of purified cyclohexane, and adding 5 mg. of vanadium tetrachloride and 425 ml. of a cyclohexane solution of aluminum trichloride of the same concentration as in Example 1, yielded 12 grams of solid linear polyethylene having a methyl content of <0.05 percent and a melt index of <0.01.

*Example 3*

Passing ethylene into 2.40 grams of triphenyl arsine, dissolved in 2 liters of cyclohexane, and adding 5 mg. of vanadium tetrachloride and 425 ml. of a cyclohexane solution of aluminum trichloride of the same concentration as in Example 1, yielded 2 grams of solid linear polyethylene having a methyl content of <0.05 percent and a melt index of <0.01.

*Example 4*

Passing ethylene into 2.75 grams of triphenyl stibine, dissolved in 2 liters of cyclohexane, and adding 5 mg. of vanadium tetrachloride and 425 ml. of a cychexane solution of aluminum trichloride, yielded 17 grams of linear polyethylene with a melt index of <0.01.

The triphenyl phosphine, triphenyl stibine, and triphenyl arsine were Eastman Kodak reagent grade.

*Example 5*

A three liter, three-necked flask was fitted with a gas inlet tube, a reflux condenser, and a mechanical stirrer. The flask was charged with 1400 ml. of purified cyclohexane and 1.42 gm. (4 millimoles) of diphenyl mercury. The temperature was raised to 65° C. and ethylene was bubbled through the system for several minutes to remove volatile contaminants. Then a solution of 3.2 grams (12 millimoles) of redistilled aluminum tribromide and 10 mg. of vanadium tetrachloride were added to the reaction flask as a cyclohexane solution. Polymerization of the ethylene began at once and continued at a good rate. Ethylene flow was maintained at 1.5 liters per minute for two hours. At the end of this time, the reaction was quenched with isopropanol and the polymer was washed free of catalyst by reslurrying it with isopropanol. The yield of dry fluffy polymer was 45 grams. This polymer had a melt index of <0.01 and a methyl content of <0.05 percent, by weight.

*Example 6*

A one liter, three-necked flask was fitted with a gas inlet tube, a reflux condenser and a mechanical stirrer. The flask was charged with approximately 450 ml. cyclohexane, 45 ml. of diphenyl zinc (1.08 millimoles) and 2 grams of a technical grade of aluminum tribromide (7.5 millimoles) containing approximately 0.01 percent by weight vanadium bromide. Ethylene was then bubbled through the system and a moderate absorption of ethylene was noted over a period of 15 minutes, the temperature rising from 27° C. to 38° C. Ethylene flow was maintained for another 10 minutes. At the end of this time the reaction was quenched with isopropanol and the polymer was washed free of catalyst. The yield of dry polymer was 4 grams. It had a melt index of <0.01 and a methyl content of <0.05 percent, by weight.

*Example 7*

A 10 gallon glass-lined autoclave was purged with ethylene to remove air and moisture and charged with 31 pounds of purified cyclohexane, 11 grams of tin tetraphenyl, and 61.5 grams of technical grade aluminum bromide which contained 0.01 percent by weight of vanadium bromide. Ethylene was then passed into the autoclave to maintain a pressure of 25 p.s.i. for 2.3 hours, the temperature of the reaction system being between 78° C.–84° C. At the end of the reaction the catalyst was inactivated by the addition of isopropanol and the polymer which had formed was washed free of catalyst with isopropanol. The yield of fluffy dry polymer was 3.1 pounds having an annealed density of 0.954 and a methyl content too low to detect by infra-red absorption at 7.25 microns.

The range of properties of several batches of polyethylene produced according to Example 7 are as follows:

| | |
|---|---|
| Melt index | 0.04–0.06 |
| Tensile modulus @ 1% elongation and at 23° C. p.s.i. | 127,000–131,000 |
| Tensile modulus @ 1% elongation and at 100° C. p.s.i. | 16,600–25,300 |
| Yield strength at 23° C. p.s.i. | 3360 |
| Yield strength at 100° C. p.s.i. | 930 |
| Percent elongation at 23° C. | 110 |
| Percent elongation at 100° C. | 432 |
| Tensile strength at 23° C. p.s.i. | 3570 |
| Tensile strength at 100° C. p.s.i. | 1160 |
| Brittleness temperature (80% of samples tested exhibiting no failure) ° C. | Below −105 |
| Dielectric constant 50 mc. at 23° C. | 2.37 |
| Dissipation factor 50 mc. at 23° C. | $40 \times 10^{-5}$ |
| Percent ash | Nil |
| Infra-red analysis: | |
| Trans. internal unsaturation (percent C=C) | 0.040 |
| Terminal unsaturation (percent C=C) | 0.008 |
| Pendent methylene | Nil |
| Carbonyl (percent >C=O) | 0.001 |

The substitution of an equivalent amount of triphenyl tin chloride for the tetraphenyl tin component of Example 7 also yielded a hard, tough polyethylene, the rate of polymerization being substantially the same.

In the subsequent Examples 8 to 11 there was used in each a technical grade of aluminum bromide containing as an impurity 0.01 percent by weight of vanadium bromide as determined by spectrographic measurement.

Example 8

A 5 l. three-neck flask was fitted with an inlet tube for introduction of ethylene, a mechanical stirrer, and a reflux condenser. The flask was charged with 1 gal. of purified cyclohexane and 5 grams of tetraphenyl lead. The temperature of the solution was raised to 60° C. and ethylene was passed into the flask at the rate of 1.5 liters per minute. Then 6 grams of aluminum bromide were dissolved in 200 ml. of cyclohexane and the solution was added to the reaction flask. After a reaction period of 3 hours and 20 minutes, the solution was poured into methanol, the polymer which had formed was removed by filtration, washed again with methanol, and dried. The yield of solid ethylene polymer was 3.8 grams. The polymer had a melt index of less than 0.1 and a methyl content less than 0.05.

Example 9

The procedure and reaction conditions were the same as described above, with the exceptions that the catalyst consisted of 4 grams of tetraethyl tin and 6 grams of the aluminum bromide, and the reaction time was two hours. The yield of solid polymer was 15.6 grams.

Example 10

The procedure was the same as for Example 8 but with the catalyst composition consisting of 17 grams of aluminum bromide and 4.3 grams of germanium tetraphenyl. With a reaction period of 2½ hours, the yield of solid ethylene polymer was 2.3 grams.

Example 11

The procedure was the same as for Example 8 but with the catalyst composition consisting of 17 grams of aluminum bromide and 10 grams of germanium tetraethyl. With a reaction period of two hours, the yield of solid ethylene polymer was 21.1 grams.

The ethylene homopolymers prepared by the catalyst compositions of the above examples had very little branching as evidenced by methyl group absorption at 7.25μ in the infra-red spectrum of the polymer. The methyl content varied from about 0.7 percent down to an amount too small to detect (<0.05 percent). Generally, the methyl group content of the ethylene polymers prepared in the presence of the catalyst composition is less than 0.1 percent and thus is not higher than the methyl group content in polymethylene prepared from diazomethane.

Further evidence for the linearity of the polymers is shown by their melting points being in the range from 130° C. to 136° C. as contrasted with 128° C. for a polyethylene prepared according to the Ziegler catalyst process; 137° C. for polymethylene prepared from diazomethane and 109° C. for DYNH-1 which is a commercial high pressure polyethylene marketed by the Bakelite Company. The density of the polymers prepared in the presence of the herein described catalyst compositions varies from approximately 0.94 to approximately 0.96 depending on molecular weight and degree of annealing.

A typical distribution of polymer molecules in a polyethylene prepared according to the novel procedures herein described is illustrated by the fractionation data of the polyethylene prepared according to Example 7. This polyethylene, 60 grams, was dissolved in 1500 ml. of ethyl benzene and fractionation was carried out at 115° C. Initially 1500 ml. of amyl alcohol was added to this solution in order to reach a cloud point. The fractions were dropped by the addition of increasing volumes of n-amyl alcohol, the first fraction usually requiring 50–100 ml. The last four or five fractions are obtained by dropping the bath temperature instead of adding large amounts of solvent. The intrinsic viscosities of the fractions were determined in tetralin at 130° C. Table II sets forth the data and shows the characteristic high concentration of moderately high molecular weight components (intrinsic viscosity from 1.6–2.8) present in polyethylene prepared with the aid of the herein described catalyst compositions and the minimum content of low molecular weight (intrinsic viscosity 0 to 1.0) and extremely high molecular weight components (intrinsic viscosity above 2.8).

TABLE II

| Fraction | Wt. percent of polymer | Intrinsic viscosity |
| --- | --- | --- |
| a | 1 | 0.4 |
| b | 1 | 0.8 |
| c | 4.5 | 1.2 |
| d | 12 | 1.6 |
| e | 13 | 2.0 |
| f | 52 | 2.4 |
| g | 16 | 2.8 |

In general all the polyethylenes as prepared in the presence of the novel catalyst composition exhibit similar distributions of polymer components in that there is a substantial absence of low intrinsic viscosity components and of extremely high viscosity components. These polyethylenes contain less than a total of 10 percent by weight of low molecular weight polymers having an intrinsic viscosity in tetralin between 0.0 and 0.8 and on the other hand contain less than 5 percent by weight of high molecular weight polymers having an intrinsic viscosity in tetralin of more than 2.8. The minimum content of low-molecular ethylene polymers results in the polyethylene having in molded form higher impact strength and greater toughness at sub-zero temperatures.

This distribution pattern has not been found in polyethylenes of similar high density prepared in the presence of previously known catalyst compositions effective for polymerizing ethylene. The high density type polyethylenes which have thus far been disclosed by others when similarly fractionated all show a considerable amount of relatively low molecular weight polymer, and gradually decreasing amounts of higher molecular weight polymers, including fractions of much higher molecular weight than are present in the polyethylenes of this invention.

Table III illustrates a typical fractional analysis of a polyethylene prepared in the presence of a Ziegler type catalyst, namely a mixture of an aluminum trialkyl and a titanium halide.

TABLE III

| Fraction | Wt. percent of polymer | Intrinsic viscosity |
| --- | --- | --- |
| a | 38 | 0.4 |
| b | 20.5 | 0.8 |
| c | 11.5 | 1.2 |
| d | 6.0 | 1.6 |
| e | 5.5 | 2.4 |
| f | 3.5 | 2.8 |
| g | 3.5 | 3.2 |
| h | 2.5 | 4.0 |
| i | 1.5 | 4.4 |
| j | 1.5 | 4.8 |
| k | 1.0 | 5.2 |

Another catalyst system for polymerizing polyethylene is based on a reducible oxide of a metal of Group VI in association with an active or promoting catalyst support, this being sometimes referred to as the Philips Process, and is more particularly described in Belgium Patent 530,617. Table IV sets forth the fractional analysis of a polyethylene prepared in the presence of such a catalyst system.

TABLE IV

| Fraction | Wt. percent of polymer | Intrinsic viscosity |
|---|---|---|
| a | 21.5 | 0.4 |
| b | 20.5 | 0.8 |
| c | 13 | 1.2 |
| d | 8.5 | 1.6 |
| e | 7.5 | 2.0 |
| f | 8.5 | 2.4 |
| g | 6.5 | 2.8 |
| h | 4 | 3.2 |
| i | 3 | 3.6 |
| j | 2.5 | 4.0 |
| k | 2 | 4.4 |
| l | 1.5 | 4.8 |
| m | 1 | 5.2 |
| n | 0.5 | 5.6 |

The ethylene homopolymers prepared in the presence of the novel catalyst compositions herein described are useful for the production of molded articles, extruded films, and fibers and particularly for those applications requiring substantial resistance to heat, flexibility retention at low temperatures, and substantial stiffness.

This application is a continuation-in-part of my copending application Serial No. 524,824 filed July 27, 1955.

What is claimed is:

1. A process for polymerizing ethylene which comprises contacting ethylene with a catalyst composition essentially comprising as one component a hydrocarbon soluble aluminum trihalide, as a second component an organo-metallic compound having hydrocarbon groups bound to a metal selected from Groups II–B, IV–A, and V–A of the Periodic System of Elements and as a third component a trace amount of a vanadium compound selected from the group consisting of hydrocarbon soluble vanadium compounds and vanadium compounds forming hydrocarbon-soluble compounds with the aluminum halide.

2. Process according to claim 1, wherein the ethylene is contacted with the catalyst composition dispersed in an inert hydrocarbon liquid.

3. A process according to claim 1, wherein the organo-metallic compound contains halogen directly attached to the metal atom.

4. Process according to claim 1, wherein the ethylene contains between 50 and 3000 p.p.m. of oxygen.

5. A process for producing solid polymers of ethylene which comprises contacting ethylene at a temperature between about 10° C. and 140° C. in the presence of a liquid hydrocarbon substantially free from oxygen, sulfur, and compounds of oxygen or sulfur, with a catalyst composition essentially comprising a hydrocarbon soluble aluminum trihalide, an organo-metallic compound having hydrocarbon groups bound to a metal selected from Groups II–B, IV–A, and V–A of the Periodic System of Elements and a minute amount of a vanadium compound selected from the group consisting of hydrocarbon soluble vanadium compounds and vanadium compounds forming hydrocarbon-soluble compound by interaction with the aluminum trihalide.

6. Process for polymerizing ethylene to a normally solid substantially linear polyethylene which comprises contacting ethylene with a catalyst composition dispersed in a hydrocarbon liquid, said composition essentially comprising as one component a hydrocarbon soluble aluminum trihalide, as a second component an organo-metallic compound having hydrocarbon groups bound to a metal selected from Groups II–B, IV–A and V–A of the Periodic System of Elements and as the third component a hydrocarbon soluble compound of vanadium in an amount between 0.0005 and 0.05 mole per mole of aluminum trihalide, and the molar ratio of aluminum trihalide to organo-metallic compound being between 1:20 and 20:1, and recovering the solid polymer thus produced.

7. Process according to claim 6 wherein the organo-metallic compound is a compound of tin.

8. Process according to claim 6 wherein the organo-metallic compound is a compound of bismuth.

9. Process according to claim 6 wherein the organo-metallic compound is a compound of mercury.

10. Process according to claim 6 wherein the organo-metallic compound is a compound of tin having the formula $SnR_nX_m$ wherein R is an aryl group, X is a halogen selected from the group consisting of chlorine and bromine, $n$ is 3 or 4, $m$ is zero or one, and the sum of $n$ and $m$ equals four.

11. Process according to claim 6 wherein the organo-metallic compound is tetraphenyl tin and the vanadium compound is vanadium tetrachloride.

12. A normally solid linear polyethylene characterized by a melt index value of less than 0.1, a methyl group content not in excess of 0.1 percent and a total content not in excess of 10 percent by weight of low molecular weight ethylene polymers having an intrinsic viscosity in tetralin at 130° C. between 0.0 and 0.8 produced by the process of claim 10.

13. A process for producing a solid polymer from ethylene, which comprises contacting said ethylene at a temperature between 20° C. and 100° C. and a pressure between one and ten atmospheres, in the presence of a liquid hydrocarbon substantially free from oxygen, sulfur, and compounds of oxygen or sulfur, with a catalyst consisting on a molar basis of 50 percent to 90 percent technical grade aluminum bromide and the remainder tetraphenyl tin, and recovering the solid polymer thus produced.

14. Process as claimed in claim 13 in which the liquid hydrocarbon is cyclohexane, the temperature is approximately 25° C. to 50° C., and the pressure is substantially atmospheric.

15. The process which comprises polymerizing ethylene in a suspension in an inert organic solvent of a complex of a commercial aluminum halide selected from the group consisting of aluminum chloride and aluminum bromide with from about one-twentieth to twenty times the molar amount of a metal compound selected from the group consisting of tetrahydrocarbon tin, tetrahydrocarbon lead, and trihydrocarbon tin halide, said hydrocarbon selected from the group consisting of alkyl, aryl, aralkyl and alkaryl hydrocarbons.

16. The process for polymerizing ethylene which comprises bubbling ethylene into a suspension in an inert organic solvent of a complex of an aluminum halide containing from about 0.0005 mole to about 0.05 mole per mole of aluminum halide of an activator consisting of vanadium in the form of halides with from about 0.05 mole to about 20 mole per mole of aluminum halide of a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms.

17. Catalyst composition effective for polymerizing ethylene to a normally solid linear polymer, said composition essentially comprising a liquid hydrocarbon soluble aluminum trihalide, an organo-metallic compound having hydrocarbon groups bound to a metal selected from Groups II–B, IV–A, and V–A of the Periodic System of Elements and a vanadium compound selected from the group consisting of hydrocarbon soluble vanadium compounds and compounds of vanadium reactive with the aluminum trihalide to form a hydrocarbon soluble compound, the molar ratio of aluminum trihalide to organo-metallic compound being between 1:20 and 20:1, and the vanadium compound being present in amounts between 0.0005 and 0.05 mole per mole of aluminum trihalide.

18. Catalyst composition according to claim 17 wherein the organo-metallic compound is a compound of mercury.

19. Catalyst composition according to claim 17 wherein the organo-metallic compound is a compound of tin.

20. Catalyst composition according to claim 17 wherein the organo-metallic compound is a compound of bismuth.

21. Catalyst composition according to claim 17 wherein the organo-metallic compound is a compound of tin having the formula $SnR_nX_m$ wherein R is an aryl group, X is a halogen selected from the group consisting of chlorine and bromine, $n$ is 3 or 4, $m$ is zero or one, and the sum of $n$ and $m$ is four.

22. As a new composition of matter, useful in catalyzing the polymerization of ethylene consisting essentially of, a mixture of technical grade aluminum tribromide and tin tetraphenyl in substantially the molar proportions 50 percent to 90 percent aluminum tribromide, remainder tin tetraphenyl.

23. A catalyst for polymerizing olefins comprising the complex of a commercial aluminum halide selected from the group consisting of aluminum chloride and aluminum bromide with a metal compound selected from the group consisting of tetrahydrocarbon tin, tetrahydrocarbon lead, and trihydrocarbon tin halide, said hydrocarbon being selected from the group consisting of alkyl, aryl, aralkyl, and alkaryl hydrocarbons.

24. A catalyst according to claim 23, wherein the metal compound is present in an amount ranging from about one-twentieth to twenty times the molar amount of the aluminum halide.

25. A catalyst according to claim 23, wherein the aluminum halide is technical commercial aluminum chloride.

26. A catalyst according to claim 23, wherein the aluminum halide is technical commercial aluminum bromide.

27. A catalyst for polymerizing olefins comprising the complex of a commercial aluminum halide selected from the group consisting of aluminum chloride and aluminum bromide with from about one-twentieth to twenty times the molar amount of tetrahydrocarbon tin, said hydrocarbon being selected from the group consisting of alkyl, aryl, aralkyl, and alkaryl hydrocarbons.

28. A catalyst for polymerizing olefins comprising the complex of a commercial aluminum halide selected from the group consisting of aluminum chloride and aluminum bromide with from about one-twentieth to twenty times the molar amount of trihydrocarbon tin halide, said hydrocarbon being selected from the group consisting of alkyl, aryl, aralkyl, and alkaryl hydrocarbons.

29. A catalyst for polymerizing ethylene comprising the complex of commercial aluminum chloride with from about one-twentieth to twenty times the molar amount of tetraphenyl tin.

30. A catalyst suitable for the polymerization of ethylene comprising the complex of an aluminum halide containing as an activator, vanadium in the form of halides with a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms wherein said activator is present in an amount ranging from about 0.0005 mole to about 0.05 mole of activator per mole of aluminum halide, and said metal compound is present in said complex in an amount ranging from about 0.05 mole to about 20 mole per mole of aluminum halide.

31. A catalyst as defined in claim 30, wherein the aluminum halide is aluminum chloride.

32. A catalyst as defined in claim 30, wherein the aluminum halide is aluminum bromide.

33. A catalyst suitable for the polymerization of ethylene comprising the complex of an aluminum halide containing from about 0.0005 moles to about 0.05 moles per mole of aluminum halide of vanadium in the form of a vanadium halide as an activator with from about 0.05 mole to about 20 mole per mole of aluminum halide of a hydrocarbon-substituted compound of tetravalent tin wherein at least three of the tin valences are connected to hydrocarbon radicals selected from the group consisting of alkyl and phenyl, with any remaining valences connected to halogen atoms.

34. A catalyst suitable for the polymerization of ethylene comprising the complex of an aluminum halide containing from about 0.0005 moles to about 0.05 moles per mole of aluminum halide of vanadium in the form of a vanadium halide as an activator with from about 0.05 mole to about 20 mole per mole of aluminum halide of a hydrocarbon-substituted compound of tetravalent lead wherein at least three of the lead valences are connected to hydrocarbon radicals selected from the group consisting of alkyl and phenyl, with any remaining valences connected to halogen atoms.

35. A catalyst suitable for the polymerization of ethylene comprising the complex of an aluminum halide containing from about 0.0005 moles to about 0.05 moles per mole of aluminum halide of vanadium in the form of a vanadium halide as an activator with from about 0.05 mole to about 20 mole per mole of aluminum halide of tetrahydrocarbon lead said hydrocarbon being selected from the group consisting of alkyl and phenyl.

36. A catalyst suitable for the polymerization of ethylene comprising the complex of an aluminum halide containing from about 0.0005 moles to about 0.05 moles per mole of aluminum halide of vanadium in the form of a vanadium halide as an activator with from about 0.05 mole to about 20 mole per mole of aluminum halide of trihydrocarbon tin halide said hydrocarbon being selected from the group consisting of alkyl and phenyl.

37. A catalyst suitable for the polymerization of ethylene comprising the complex of an aluminum halide containing from about 0.0005 moles to about 0.05 moles per mole of aluminum halide of vanadium in the form of a vanadium halide as an activator with from about 0.05 mole to about 20 mole per mole of aluminum halide of tetrahydrocarbon tin said hydrocarbon being selected from the group consisting of alkyl and phenyl.

38. A catalyst suitable for the polymerization of ethylene comprising the complex of aluminum chloride containing vanadium chloride as an activator in an amount ranging from about 0.0005 mole to about 0.05 mole of vanadium chloride per mole of aluminum chloride with from about 0.05 mole to about 20 mole per mole of aluminum chloride of tetraphenyl tin.

39. The process for preparing a catalyst suitable for the polymerization of ethylene, which comprises contacting in an inert organic solvent an aluminum halide, an activator consisting of vanadium in the form of halides in an amount ranging from about 0.0005 moles of about 0.05 mole per mole of the aluminum halide, and a hydrocarbon-substituted compound of a tetravalent metal having the formula $M(R)_n$ wherein M is selected from the group consisting of tin and lead, R is a hydrocarbon radical selected from the group consisting of alkyl and phenyl, and $n$ is an integer from 3 to 4, the metal of said metal compound having at least three of its valences connected to hydrocarbon radicals with any remaining valences connected to halogen atoms, said metal compound being present in an amount ranging from about 0.05 mole to about 20 mole per mole of said aluminum halide.

References Cited by the Examiner

UNITED STATES PATENTS

| | | | |
|---|---|---|---|
| 2,683,140 | 7/54 | Howard | 260—94.9 |
| 2,762,791 | 9/56 | Pease et al. | 260—94.9 |
| 2,816,883 | 12/57 | Larcher | 260—94.9 |
| 2,822,357 | 2/58 | Brebner et al. | 260—94.9 |
| 2,825,721 | 3/58 | Hogan et al. | 260—94.9 |

(Other references on following page)

UNITED STATES PATENTS

| | | | |
|---|---|---|---|
| 2,827,446 | 3/58 | Breslow | 260—94.9 |
| 2,867,612 | 1/59 | Pieper et al. | 260—94.9 |
| 2,898,330 | 8/59 | Isbenjian | 260—94.9 |
| 2,900,374 | 8/59 | Aries | 260—94.9 |

FOREIGN PATENTS

| | | |
|---|---|---|
| 530,617 | 1/55 | Belgium. |
| 540,459 | 8/55 | Belgium. |
| 543,941 | 6/56 | Belgium. |
| 547,618 | 11/56 | Belgium. |
| 502,597 | 5/54 | Canada. |

OTHER REFERENCES

Chemical and Engineering News, April 28, 1958, page 46.

Skoldinor et al., Zhur. Obschei Khim., 12, No. 7-8, pages 398-402 (1942).

Schildknecht, Vinyl and Related Polymers, John Wiley & Sons, N.Y. (1952), pages 510-512.

Kantor et al., J. Am. Chem. Soc., vol. 75, pp. 931-932 (1953)

JOSEPH L. SCHOFER, *Primary Examiner.*

ALLEN M. BOETTCHER, B. E. LANHAM, LESLIE H. GASTON, *Examiners.*